US008827689B2

(12) United States Patent
Briard et al.

(10) Patent No.: US 8,827,689 B2
(45) Date of Patent: Sep. 9, 2014

(54) DEVICE FOR FORMING BOXED CONTAINERS

(75) Inventors: Arnaud Briard, Octeville sur Mer (FR); Nicolas Chomel, Octeville sur Mer (FR); Sylvain Auvray, Octeville sur Mer (FR); Jean-Christophe Langlois, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 585 days.

(21) Appl. No.: 13/122,859

(22) PCT Filed: Sep. 29, 2009

(86) PCT No.: PCT/FR2009/001161
§ 371 (c)(1),
(2), (4) Date: Aug. 29, 2011

(87) PCT Pub. No.: WO2010/040909
PCT Pub. Date: Apr. 15, 2010

(65) Prior Publication Data
US 2011/0300250 A1    Dec. 8, 2011

(30) Foreign Application Priority Data

Oct. 7, 2008   (FR) ..................... 08 05542
Dec. 3, 2008   (FR) ..................... 08 06796

(51) Int. Cl.
*B29C 33/30*    (2006.01)
(52) U.S. Cl.
USPC ............................ 425/541; 425/161; 425/522

(58) Field of Classification Search
CPC   C29C 33/306; C29C 49/4802; B29C 33/306; B29C 49/4802
USPC ........................................ 425/161, 522, 541
See application file for complete search history.

(56) References Cited

U.S. PATENT DOCUMENTS

| 4,123,217 A | 10/1978 | Fischer et al. |
| 5,026,268 A * | 6/1991 | Lee ........................... 425/525 |
| 6,074,596 A | 6/2000 | Jacquet |
| 2002/0090409 A1 | 7/2002 | Seger |
| 2003/0150586 A1 | 8/2003 | Matsuura et al. |
| 2007/0145646 A1 | 6/2007 | Cho |

FOREIGN PATENT DOCUMENTS

| EP | 0 888 864 A1 | 1/1999 |
| FR | 2 833 872 A1 | 6/2003 |
| JP | 8-323845 A | 12/1996 |

* cited by examiner

*Primary Examiner* — Yogendra Gupta
*Assistant Examiner* — Alison Hindenlang
(74) *Attorney, Agent, or Firm* — Sughrue Mion, PLLC

(57) ABSTRACT

Device for forming containers from blanks made of plastic material, having a mold provided with a wall defining a cavity intended to receive the blank; a boxing insert mounted movably with respect to the mold between a retracted position in which the insert is retracted into the wall, and an extended position in which the insert projects from the wall toward the interior of the cavity; a plate, on which the insert is rigidly fixed; a support on which the plate is removably mounted; and a system for the quick attachment of the plate to the support.

16 Claims, 8 Drawing Sheets

DEVICE FOR FORMING BOXED CONTAINERS

The invention relates to forming containers from blanks made of thermoplastic material, and more specifically to forming containers provided with hollow reserves such as integrated handles.

The manufacture of containers generally comprises a blow forming operation that takes place in a mold whose wall defines a cavity inside of which the blank is inserted. During the blow forming, said blank is pressed against the wall under the effect of the high gas pressure in the blank, which has been previously heated so as to allow its plastic deformation.

Some containers can be provided with hollow reserves produced for an aesthetic purpose (for example to create contours), a structural purpose (for example to produce panels intended to absorb the deformation of the container during hot filling), or a functional purpose (to produce a handle for gripping the container).

When such a reserve reaches a certain depth, the container cannot be formed in an ordinary mold because, in spite of the high blowing pressure (generally more than 30 bars), said pressure is not sufficient to perfectly apply the material against the relief of the mold intended to form the reserve, especially in the areas turned opposite from the neck of the container from which the blow bubble is developed. One solution could consist of increasing the blow pressure. However, this solution involves modifying the whole facility and it generates excessive costs related to the treatment of the gases at very high pressure. Moreover, the result is not qualitatively convincing.

Also, molds are normally used that are provided with movable inserts initially retracted into the wall of the mold and deployed in the presence of the container in the mold in order to push the wall thereof, as illustrated in the European patent application EP 1 922 256 (Sidel).

This technique, currently called "boxing," is particularly used for forming containers provided with an integrated handle. However, it is not without its disadvantages. In particular, there is a problem adapting the machine to different references. A great deal of time and work are needed to replace the parts (particularly the mold and the inserts) associated with a given container reference with the parts associated with another container reference (for example of larger capacity).

One objective of the invention is to propose a solution making it possible to facilitate the change of reference in a container forming unit equipped with an insert mold.

To that end, the invention proposes, according to a first object, a device for forming containers from blanks made of plastic material, which comprises:

A mold provided with a wall defining a cavity intended to receive the blank;

An insert mounted movably with respect to the mold between a retracted position in which the insert is retracted into the wall, and an extended position in which the insert projects from the wall toward the interior of the cavity;

A plate, on which the insert is rigidly fixed;

A support on which the plate is removably mounted;

A system for the quick attachment of the plate to the support.

It is therefore possible to proceed simply and quickly with a reference change within the same forming unit.

According to one embodiment, the attachment system comprises a lock mounted on the support and articulated between an unlocked position allowing the coupling or decoupling of the plate to the support and a locked position allowing the plate to be held on the support.

For example, the plate is provided with at least one retainer suitable for cooperating with a lock. In this case, the lock can be mounted in rotation around an axis and can comprise an oblong head, each retainer having a recess suitable for receiving the head without possibility of withdrawing in the locked position, said recess being extended by an opening capable of allowing the head to pass into the unlocked position.

The quick-attachment system preferably comprises a mechanism for blocking the lock at least in the locked position.

Furthermore, a system is preferably provided for controlling the movement of the support between a withdrawn position corresponding to the retracted position of the insert, and an advanced position corresponding to the extended position. For example, this control system comprises an actuator provided with a linear pushing device coupled to the support.

A system can also be provided for guiding the support in translation, which comprises two spaced guides on which the support is slidably mounted.

Each guide, for example, comprises a guide pin, the support having two sliding parts mounted coaxially on the pins between two end-of-travel stops.

According to a second object, the invention proposes a forming unit comprising at least one device as described above.

Other objects and advantages of the invention will be seen from the following description, with reference to the appended drawings in which.

Figure 1:
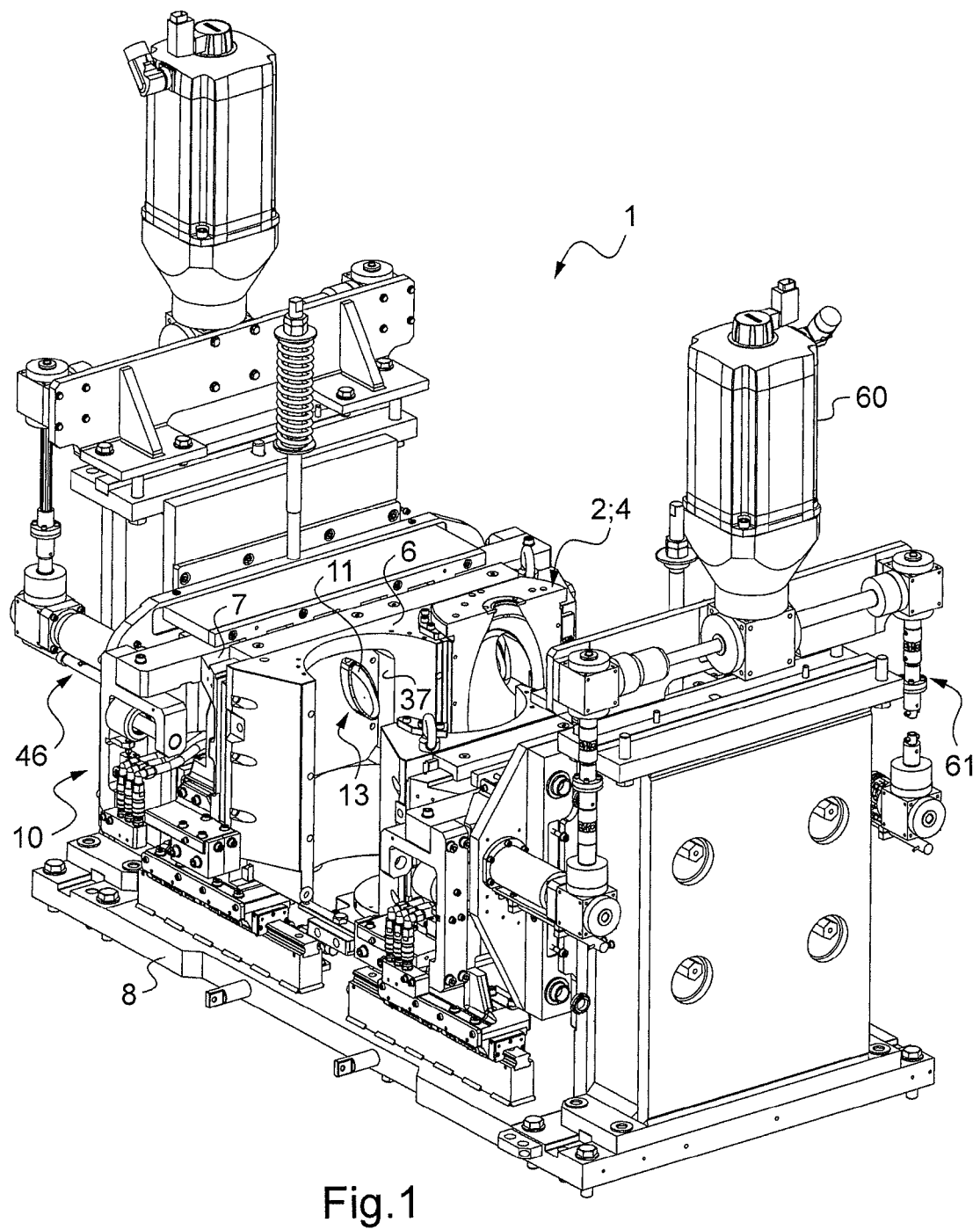
FIG. 1 is a view in perspective showing a linear type forming unit, equipped with a device according to the invention.

Partially represented in FIG. 1 is a forming unit 1 of a machine for manufacturing containers 100 from blanks of plastic material, such as PET (polyethylene terephthalate). The term "blank" is used to designate both preforms as well as intermediate containers having undergone a first series of operations in a first mold (such as pre-blowing) and intended to undergo a second series of operations in a second mold (such as blowing).

The term "forming" is used to designate both a pre-blowing or blowing operation as well as a finishing operation. In this instance, the forming unit 1 represented here is configured to perform a boxing operation on intermediate containers having undergone pre-blowing and blowing operations. Upon completion of these operations, each intermediate container has on its body two symmetrical excrescences the boxing of which causes the reversal towards the interior of the container, and the subsequent formation of two hollow reserves 101 which together constitute a handle for gripping the container 100.

As shown in FIG. 1, the forming unit 1 is of the linear type and comprises a plurality of molds 2 each provided with a wall 3 defining a cavity intended to receive a blank.

More specifically, each mold 2 comprises two half-molds 4, each provided with a half-cavity 5. The half-molds 4 are mounted facing each other on two mold-carriers 6 fixed respectively to two supports 7 that are movable in horizontal translation with respect to a fixed frame 8 of the forming unit 1, in a transverse direction perpendicular to a longitudinal direction of feeding blanks, between:

- a closed position in which the supports 7 are moved together, the half-molds 4 being in mutual contact by a joint plane 9 and the half-cavities 5 jointly forming the cavity of the mold 2;
- an open position (illustrated in FIG. 1) in which the supports 7 are separated from each other in order to allow the evacuation of the containers and the loading of the blanks.

For a more precise description of the kinematics, and a possible embodiment of a system for controlling the opening and closing of the molds 2, reference can be made to European patent application No. EP 1 924 421 in the name of the applicant.

The forming unit 1 further comprises at least one boxing device 10. Said device 10 comprises a boxing insert 11 provided for pushing the wall of the blank in the manner of a punch so as to form a hollow reserve there, for example in order to produce a handle.

In this instance, the forming unit 1, configured to accept two blanks, comprises two boxing devices 10 mounted face-to-face, provided in order to perform a simultaneous boxing of the blank on either side of the joint plane and to produce two symmetrical hollow reserves together forming one handle. Each boxing device 10 consequently comprises two boxing inserts 11 mounted in parallel and which move simultaneously.

Each insert 11 is mounted movably in translation with respect to the corresponding half-mold 4, between a retracted position in which the insert 11 is retracted into the wall 3, and an extended position in which the insert 11 projects with respect to the wall 3.

In order to allow the passage and movement of the insert 11, each half-mold 4 is provided with a transverse opening 12 whose contour corresponds, close to the working clearance, to the surface covered by the insert 11.

The boxing device 10 is designed to allow a quick mounting and dismounting of the inserts 11, which allows the interchangeability of the inserts 11, either for purposes of repair, or to adapt the unit 1 to forming containers of a different shape or capacity.

Figure 3:
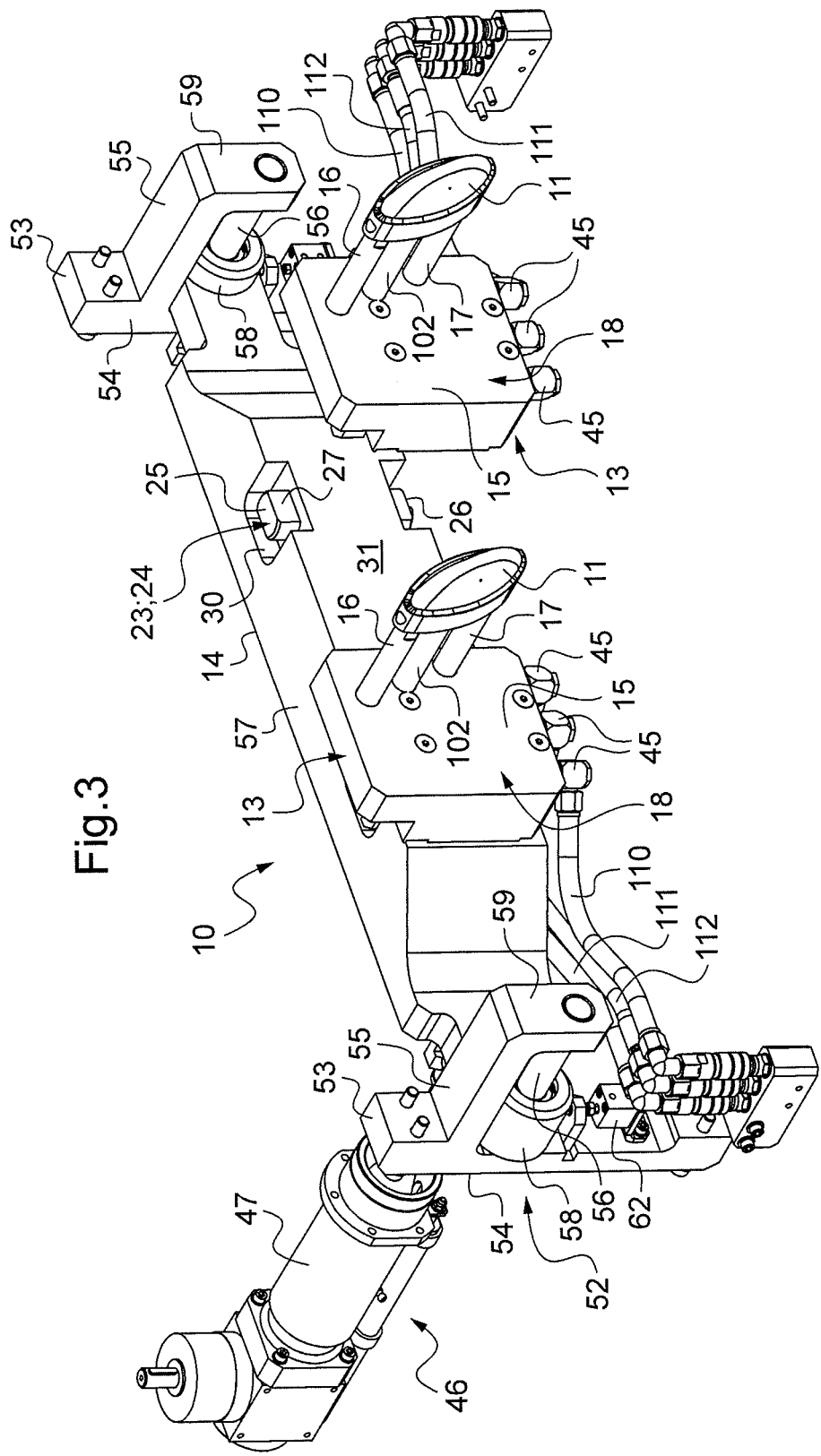
FIG. 3 is a detail view in perspective illustrating a device according to the invention.
Figure 4:
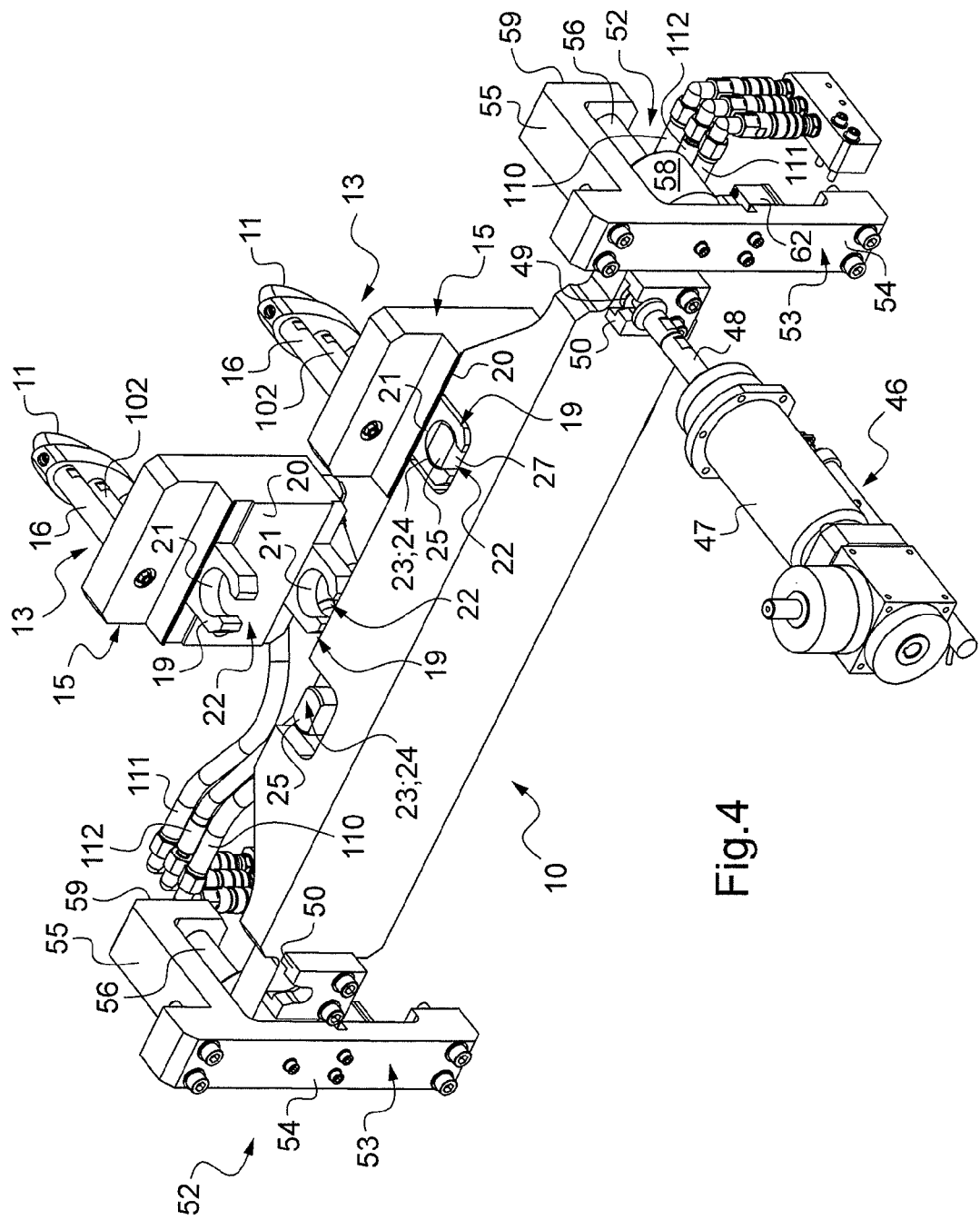
FIG. 4 is a view in perspective of the device of FIG. 3, according to another angle of view.
Figure 5:
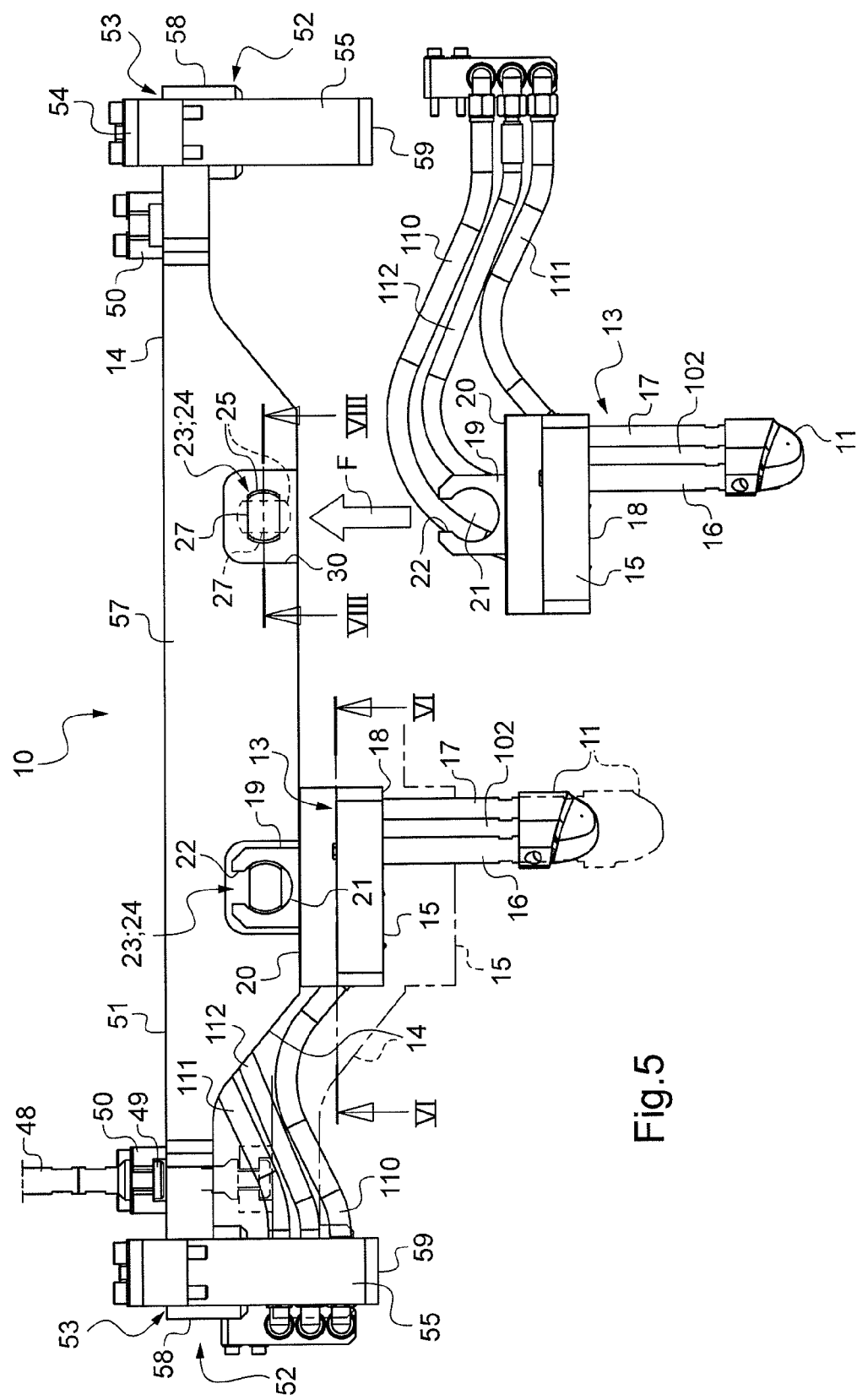
FIG. 5 is a top view of the device of FIGS. 3 and 4.

As can be clearly seen in FIGS. 3, 4 and 5, each insert 11 is part of a boxing module 13 removably mounted on a movable support 14 mounted in transverse linear translation with respect to the frame 8.

In addition to the insert 11, each boxing module 13 comprises a plate 15 substantially parallelepiped in shape, on which the insert 11 is rigidly fixed by means of three superposed rods, i.e. an upper rod 16, a lower rod, and a central rod 102, all three of which are anchored in an anterior face 18 of the plate 15.

The boxing module 13 further comprises two superposed hooking retainers 19 that extend outward perpendicular to a posterior face 20 of the plate 15.

Each retainer 19 is in the form of an open stirrup and comprises a central recess 21 substantially circular in contour, which is extended at one free end of the retainer 19 by an opening 22 of a width that is smaller than the diameter of the recess 21.

The plate 15 is removably mounted on the movable support 14 by means of a quick-attachment system 23 which comprises a lock 24 in the form of a pin provided with an upper head 25 at an upper end and a lower head 26 at a lower end.

Each head 25, 26 is oblong in shape and in the form of a cylinder whose overall diameter corresponds, within clearance, to the diameter of the recess 21, on which cylinder two opposite diametrically parallel flats 27 are made, the separation of which is slightly less than the width of the opening 22.

Each lock 24 is mounted on the support 14 by means of a hinge pin 28 connecting the heads 25, 26 and is received in a bore 29 formed in the support 14, each head 25, 26 extending into an opening 30 the shape of which is substantially complementary to a retainer 19 and which is open on an anterior face 31 of the support 14, facing the posterior face 20 of the plates 15.

Each block 24 can have two working positions, to wit:
- a locked position, illustrated by solid lines in FIG. 5, in which the heads 25, 26 extend with their flats 27 substantially parallel to the anterior face 31 of the support 14, and
- an unlocked position, illustrated by dotted lines to the right of FIG. 5, in which the heads 25, 26 extend with their flats 27 substantially perpendicular to the anterior face 31 of the support 14.

The lock 24 is articulated with respect to the support 14, the change from the locked position to the unlocked position being accomplished by a rotation of the lock 24 one quarter turn around its axis 28.

Figure 8:
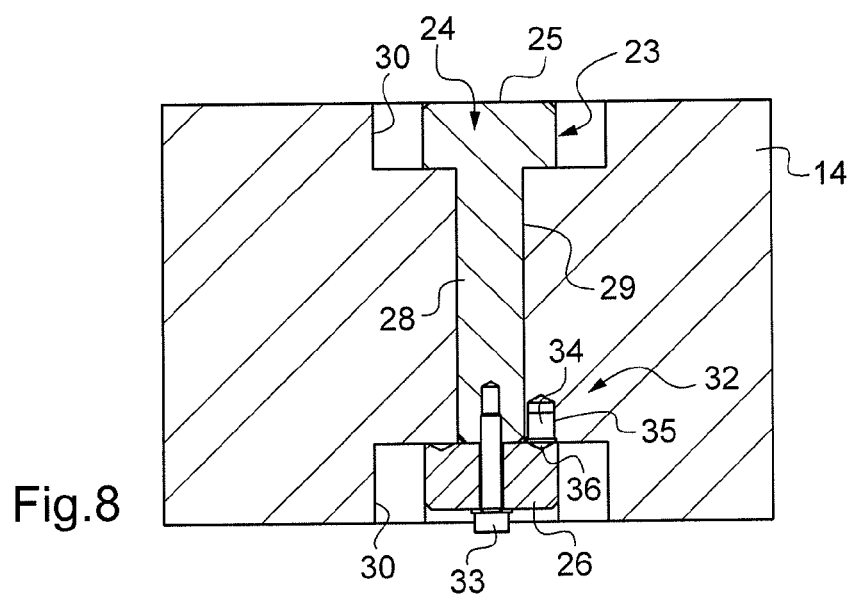
FIG. 8 is a view in partial cross-section illustrating the system of attaching the boxing insert to its support.
Figure 9:
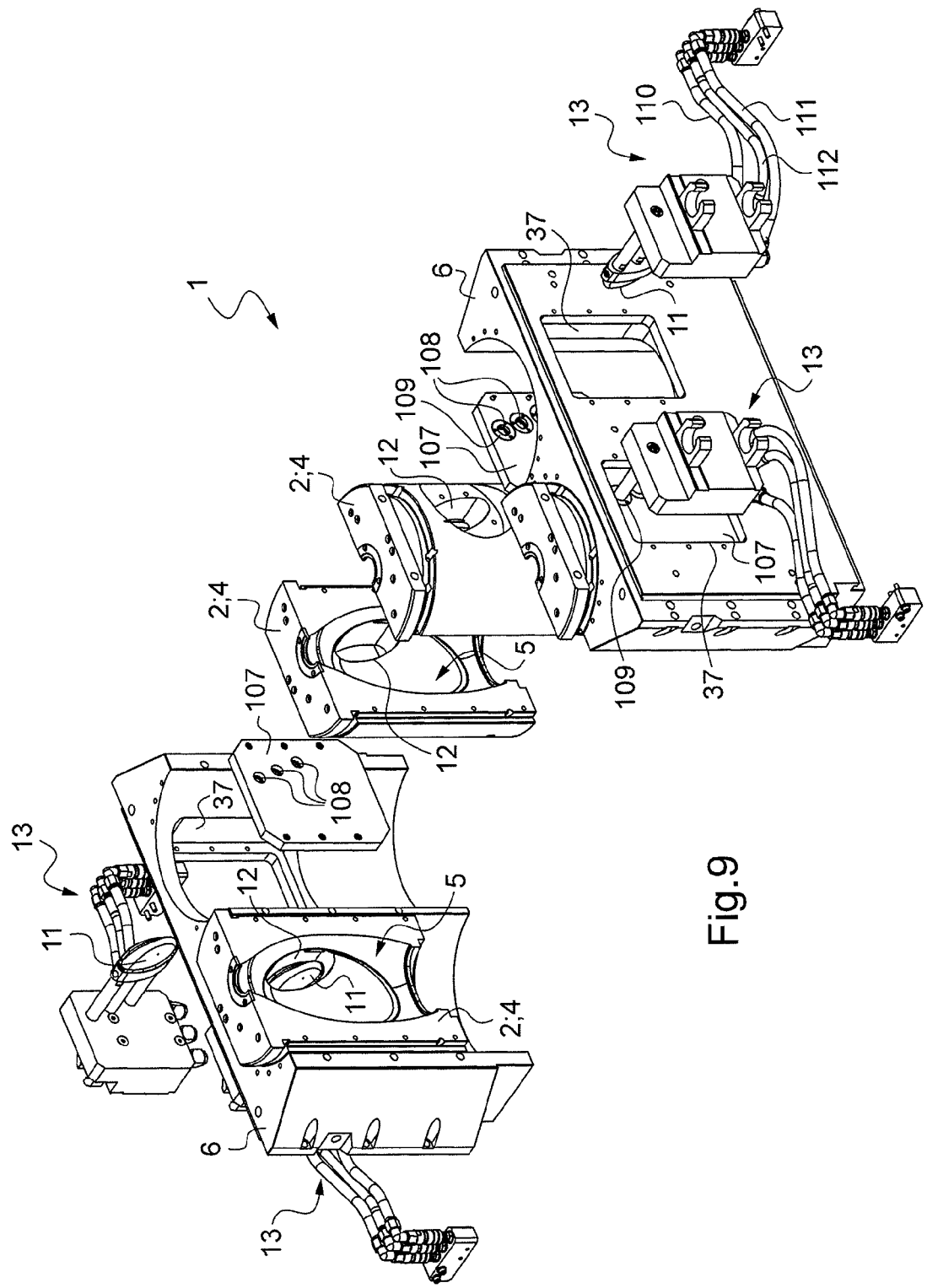
FIG. 9 is an exploded view in perspective partially showing the forming unit of FIG. 1.

As illustrated in FIG. 8, the lock 24 is provided with a position locking mechanism 32, which comprises a screw 33 for the axial tightening of the lower head 26 on the hinge pin 28.

The locking mechanism 32 of the lock 24 further comprises a locking pin 34 inserted in a hole 35 made in the support 14. The locking pin 34 rises slightly above the hole 35 and thus has a protruding part which, when the lock 24 is in either of its working positions and the screw 33 is tightened, is received in a conical notch 36 made in the lower head 26, so as to block said head (and therefore the lock 24) in rotation with respect to the support 14.

In order to change the lock 24 from one of its working positions to the other, the screw 33 is simply loosened slightly (for example by one turn), until the pin 34 comes out of the notch 36, then the lock 24 is given one fourth of a turn. The screw 33 is then re-tightened to block the lock 24 in its new position.

The coupling of a boxing module 13 to the support 14 is accomplished as follows.

The lock 24 is first placed in its unlocked position, by the method described above. The heads 25, 26 are then in their position illustrated by dotted lines in FIG. 5.

The plate 15 is then brought perpendicular to the anterior face 31 of the support 14 as indicated by the arrow F of FIG. 5, the retainers 19 being received in their respective apertures 30. The retainers 19 are fitted over the heads 25, 26, which heads are inserted into the recesses 21 through openings 22.

The lock 24 is then turned one quarter turn in order to be placed in its locking position by the method described above, as illustrated at the left of FIG. 5, so that the boxing module 13 is attached to the support 14 without the possibility of inadvertent removal.

The decoupling of the boxing module 13 from the support 14 is accomplished by the reverse procedure.

Because of the congestion in the area near the locks 24, the rotation of each lock 24 can be facilitated by using a specific tool having one yoke-shaped end that fits onto the upper head 25. A person skilled in the art will ensure that the tool has at its end a shape (for example grooved cylindrical shape) that allows it to be inserted into the recess 21, so as to allow the rotation of the lock 24 from its locked position to its unlocked position while the boxing module 13 is coupled to the support 14.

The attachment of the boxing module 13 (and thus the insert 11) to the support 14 can be classified as "quick," since only a few seconds of manual work are required to change position of the lock 24. In comparison, a conventional attachment system in which the inserts 11 are secured by simple screwing into the support 14, would require longer manual work, of a duration of several minutes.

It should be noted that the rotation of the locks 24 can be mechanized in order to accelerate this work even more. For example, a rack and pinion actuation can be provided for that purpose.

Figure 2:
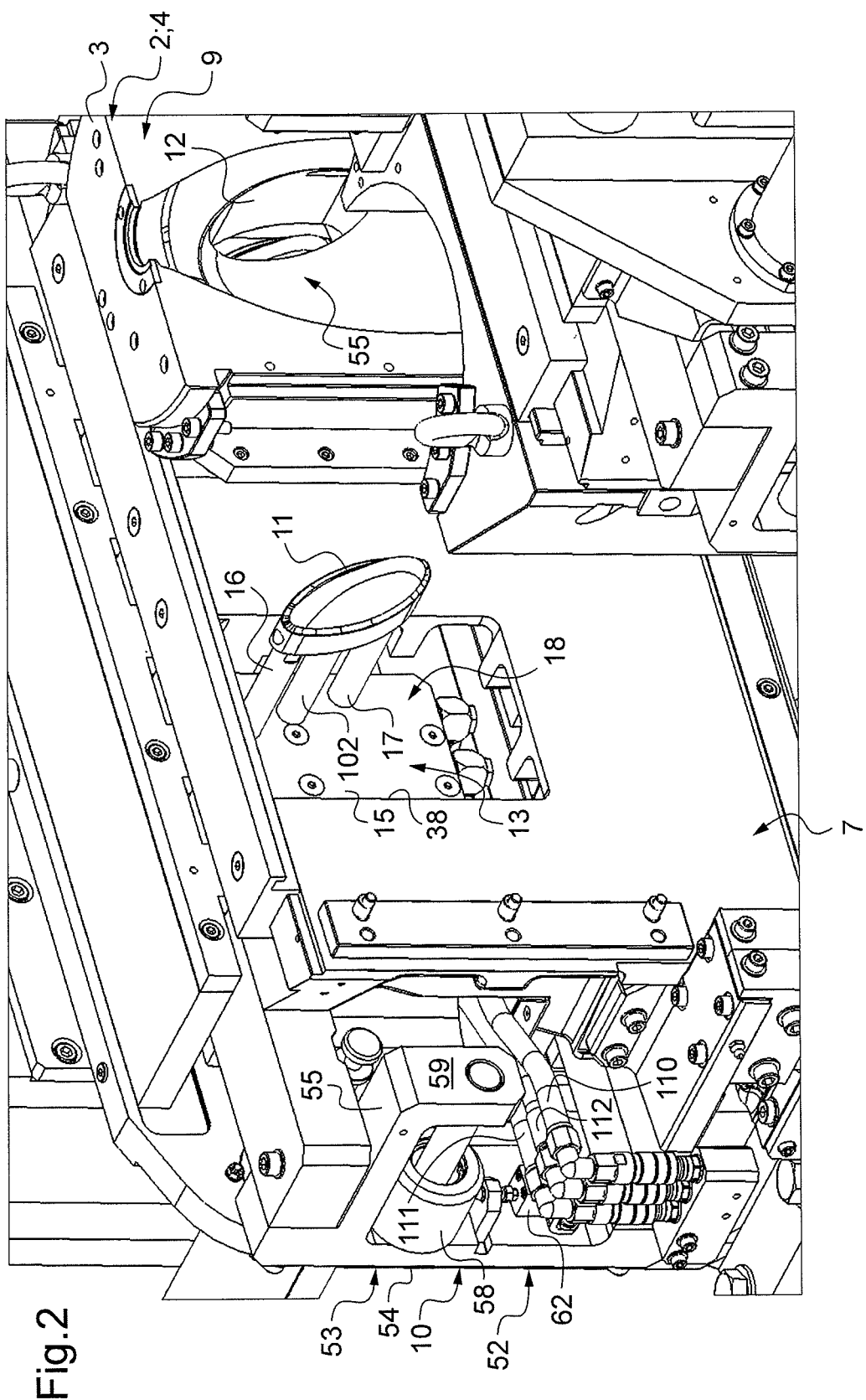
FIG. 2 is a detail view of the forming unit of FIG. 1.

In the illustrated configuration of the forming unit 1, the mounting and dismounting of each boxing module 13 requires the prior removal of the corresponding half-mold 4, as represented in FIG. 2. In order to avoid the additional removal of the half-mold 6 and of the movable support 14, openings 37, 38 will advantageously be made in the mold-carrier 6 and the support 7, respectively, to allow the passage of the boxing modules 13, as illustrated in FIGS. 1 and 2.

Figure 6:
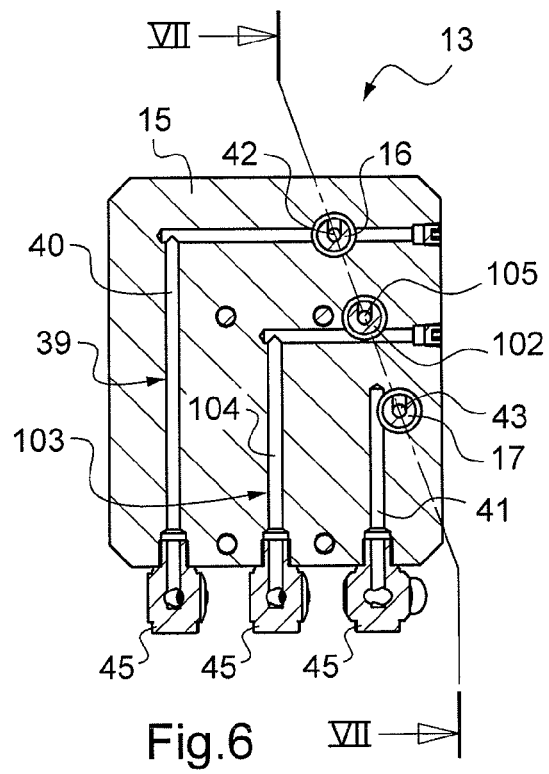
FIG. 6 is an elevation view in cross-section of a boxing insert along the sectional plane VI-VI shown in FIG. 5.
Figure 7:
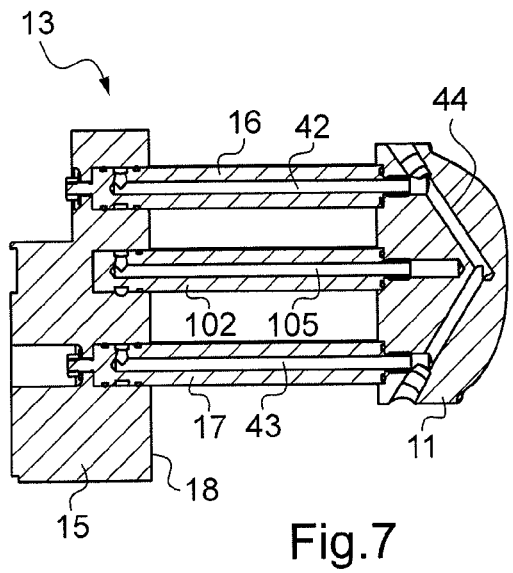
FIG. 7 is a cross-sectional view of the boxing insert of FIG. 6, along the sectional plane VII-VII shown in FIG. 6.

Furthermore, as illustrated in FIGS. 6 and 7, each boxing module 13 can be provided with a system 39 for circulating a heat-transfer fluid used for heating or cooling the insert 11, depending on the applications.

Said system 39 comprises a feed line 40 and an evacuation line 41 for the fluid, drilled in the plate 15 and connected to two bores 42, 43 made respectively in the upper rod 16 and in the lower rod 17. A conduit 44 made in the insert 11 connects the bores 42, 43 to allow the circulation of the fluid and the heating (or the cooling) of the insert 11.

An additional system 103 for injection of a gas is also made in the insert 11. This system 103 comprises a feed line 104 for the gas (for example compressed air), drilled into the plate 15 and connected to a bore 105 part of which is in the central rod 104 and part in the insert 11. Said bore 105 opens, on an outer face of the insert 11, into a compensation chamber 106.

Said compensation chamber 106 is delimited, on the one hand, laterally, by the opening 12 in the half-mold 4 and the opening 37 in the mold-carrier 6, and, on the other hand, transversely, on the side of the half-cavity 5 by the container 100 (when it is present), and on the side of the support 7 by a sealed cover plate 107 of the chamber 106, fitted in the opening 37 and fixed (by screwing for example) in the mold-carrier 6.

The plate 107 comprises three superposed holes 108 in which the rods 16, 17, 102 are slidably mounted to allow the translation movement of the boxing module 13. The seal of the passage of the rods 16, 17, 102 through the holes 108 can be ensured by means of dynamic lip seals 109 mounted in counter bores formed in the plate 107 around each hole 108.

The compensation chamber 106 thus delimits a sealed volume within which the insert 11 circulates, and in which a pressurized gas (such as air) can be injected, for example by means of the air system 103. In this way the pressure in the chamber 106 can compensate the pressure in the container 100 during forming, thus avoiding the deformations that could affect the hollow reserves 101, whose temperature when still high could, without compensation, lead to their deformation under the effect of the pressure in the container 100.

The lines 40, 41, 104 open onto a lower face of the plate 15. Connectors 45, screwed into the openings of the lines 40, 41, 104, connect said lines respectively to the flexible feed and evacuation tubes 110, 111 of the heat-transfer fluid, and a flexible feed tube 112 for the pressurized gas.

Figure 10:
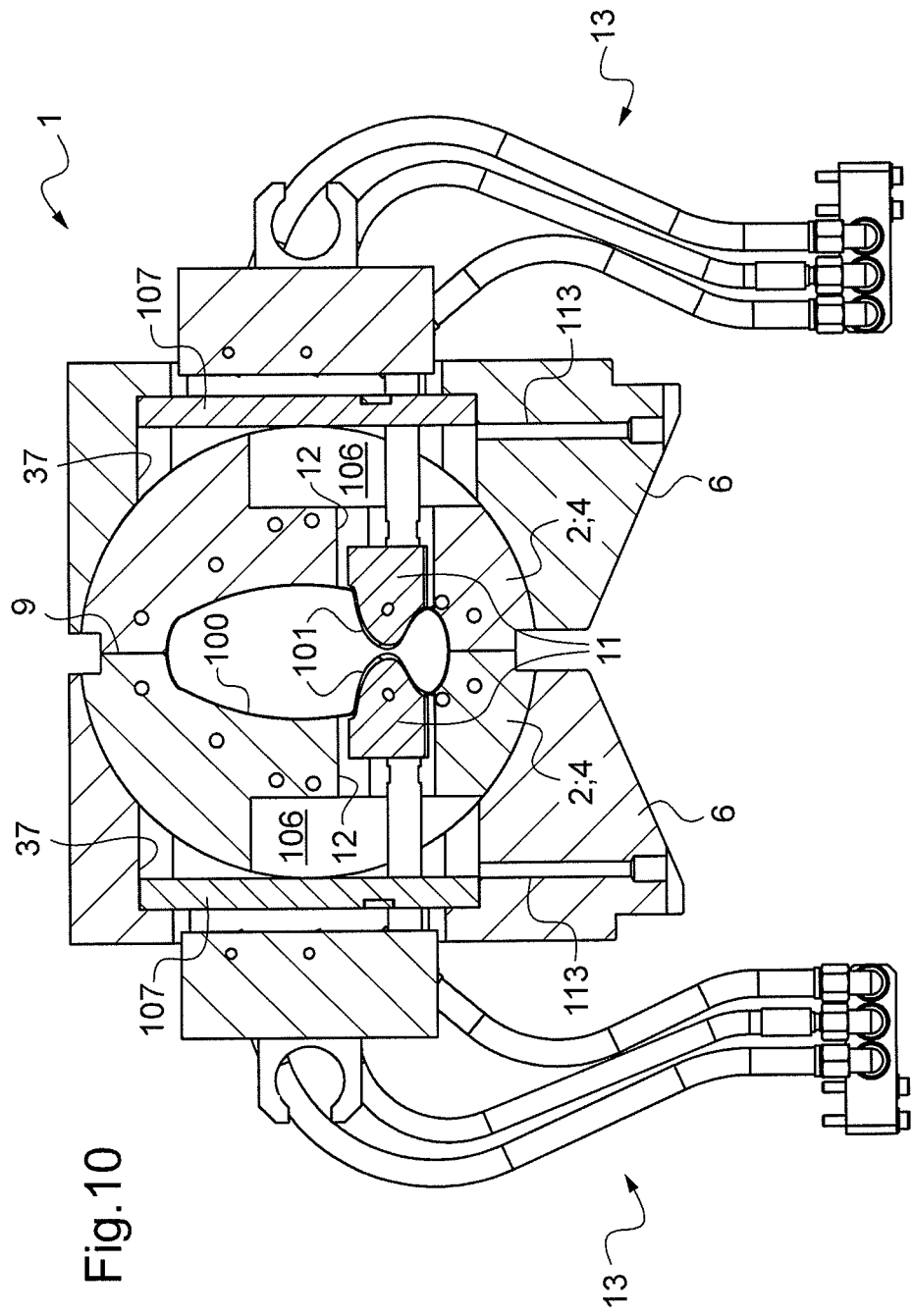
FIG. 10 is a transverse cross-sectional view of the forming unit of FIG. 8, shown in the closed position during the boxing operation of a container.

The pressurized gas present in the compensation chamber 106 can be evacuated to the exterior via a line 113 drilled transversely in the mold-carrier 6, as illustrated in FIG. 10. Said line 113 is advantageously connected to a muffler (not shown) in order to absorb at least part of the noise due to the decompression of the chamber 106.

As can be seen particularly in FIGS. 3, 4 and 5, the boxing device 13 further comprises a system 46 for controlling the guided movement of the support 14 between:
 a withdrawn position, corresponding to the retracted position of the inserts 11 and illustrated by the solid lines in FIGS. 3, 4 and 5, and
 an advanced position, corresponding to the extended position of the inserts 11 and partially illustrated by dotted lines to the left in FIG. 5.

The control system 46 comprises an actuator 47 fixed to the frame 8 and including a linear pushing device 48 provided, at one free end, with a head 49 fitted in a limit stop 50 fixed on a rear face 51 of the support 14, so as to couple said support in translation to the pushing device 48.

The boxing device 13 further comprises a linear guide system 52 for the translation movement of the support 14. This system 52 comprises two spaced guides 53 between which the support 14 is mounted and to which it is attached. Each guide 53 comprises an upright 54 rigidly attached to the frame 8, as well as a bracket 55 extending at right angles to the upright 54 and supporting a cylindrical guide rod 56.

The support 14 has, on either side of a central body 57 receiving the boxing modules 13, two opposite longitudinal ends 58 shaped as slides, each of which is mounted coaxially on a guide rod 56.

In the withdrawn position of the support 14, the slides 58 reach an end-of-travel stop against the upright 54. In the advanced position of the support 14, the slides 58 reach an end-of-travel stop against a right angle return 59 formed at one front end of the bracket 55.

The actuator 47 can be of the pneumatic type, the pushing device 48 being for example in the form of a double acting cylinder. In the embodiment represented, however, the control system 46 is of the electromechanical type. In this case, the actuator 47 is mechanical and the system 46 comprises an electric motor 60 (for example of the brushless type) the output shaft of which is coupled to the actuator 47 by means of a bell crank transmission 61 engaging the pushing device 48 by a rack and pinion type assembly.

Moreover, as can be seen in FIG. 3, the guide system 52 can be equipped with means for detecting the position of the support 14, for example in the form of a sensor 62 fixed to each upright 54 and configured to detect the presence of this slide 58 in the withdrawn position.

The invention claimed is:
1. Device for forming containers from blanks made of plastic material, which comprises:
 a mold provided with a wall defining a cavity intended to receive the blank;
 a boxing insert mounted movably with respect to the mold between a retracted position in which the insert is retracted into the wall, and an extended position in which the insert projects from the wall toward the interior of the cavity;

a plate, on which the insert is rigidly fixed;

a support on which the plate is removably mounted; and a system for the quick attachment of the plate to the support, the attachment system comprising a lock mounted on the support and articulated between an unlocked position allowing the coupling or decoupling of the plate to the support, and a locked position allowing the plate to be held on the support;

the plate being provided with at least one retainer configured to cooperate with the lock, the lock being mounted in rotation around an axis and comprises at least one oblong head, each retainer has a recess configured to receive the head without possibility of withdrawal in the locked position, said recess being extended by an opening capable of allowing the head to pass into the unlocked position.

2. Device according to claim 1, wherein the quick attachment system comprises a mechanism for blocking the lock at least in the locked position.

3. Device according to claim 1, comprising a system for controlling the movement of the support between a withdrawn position corresponding to the retracted position of the insert, and an advanced position corresponding to the extended position of the insert.

4. Device according to claim 3, wherein the control system comprises an actuator provided with a linear pushing device coupled to the support.

5. Device according to claim 3, comprising a system for guiding the support in translation, which comprises two spaced guides on which the support is slidably mounted.

6. Device according to claim 5, wherein each guide comprises a guide pin, and in that the support has two sliding parts mounted coaxially on the pins between two end-of-travel stops.

7. Device according to claim 1, comprising a mold-carrier which, with the mold, delimits a sealed compensation chamber.

8. Device according to claim 7, wherein the compensation chamber is closed, on the side of the mold-carrier, by a plate fixed to the mold-carrier and with respect to which the insert is movably mounted.

9. Device according to claim 1, which further comprises a mold-carrier provided with an opening allowing the passage of a boxing module comprising the insert and the plate.

10. Device according to claim 7, which further comprises a support on which the mold-carrier is fixed, said support being provided with an opening allowing the passage of a boxing module comprising the insert and the plate.

11. Unit for forming containers from blanks of plastic material, comprising at least one device according to claim 1.

12. Device according to claim 1, wherein the recess is defined by a penannular or C-shaped cross-section.

13. Device according to claim 1, wherein the head of the lock is inserted into the recess in a first direction, and the head of the lock is rotatable about an axis transverse to the first direction.

14. A device for forming containers from blanks made of plastic material, comprising:

a mold provided with a wall defining a cavity intended to receive the blank;

a boxing insert movably mounted with respect to the mold between a retracted position in which the insert is retracted into the wall, and an extended position in which the insert projects from the wall toward the interior of the cavity;

a plate, on which the insert is rigidly fixed;

a support on which the plate is removably mounted; and a hook and rotatable lock that cooperate to attach the plate to the support, the attachment system including:

the lock mounted on the support and rotatable between an unlocked position allowing the coupling or decoupling of the plate to the support, and a locked position allowing the plate to be held on the support;

the plate being provided with at least one retainer suitable for cooperating with the lock.

15. The device according to claim 14, wherein the hook defines a penannular or C-shaped cross-section.

16. The device according to claim 14, wherein the rotatable lock is inserted into the hook in a first direction, and the rotatable lock is rotatable about an axis transverse to the first direction.

* * * * *